(12) United States Patent
Huang et al.

(10) Patent No.: US 7,541,693 B2
(45) Date of Patent: Jun. 2, 2009

(54) POWER DISTRIBUTION NETWORK FOR COMPUTER SYSTEMS AND OTHER LOW-POWER APPLICATIONS

(75) Inventors: Lilly Huang, Portland, OR (US); Pavan Kumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 11/150,968

(22) Filed: Jun. 13, 2005

(65) Prior Publication Data
US 2007/0007823 A1 Jan. 11, 2007

(51) Int. Cl.
*H02J 3/00* (2006.01)
*H02J 1/10* (2006.01)
(52) U.S. Cl. ...................................... 307/58
(58) Field of Classification Search ............... 307/58, 307/45, 50, 105
See application file for complete search history.

(56) References Cited
U.S. PATENT DOCUMENTS
5,994,792 A * 11/1999 Pereira ........................ 307/38

6,691,233 B1 * 2/2004 Gannage et al. ............. 713/300
6,980,188 B1 * 12/2005 Worley et al. ................. 345/90
7,053,891 B2 * 5/2006 Kee ............................. 345/211

\* cited by examiner

*Primary Examiner*—Albert W Paladini
*Assistant Examiner*—Carlos Amaya
(74) *Attorney, Agent, or Firm*—Buckley, Maschoff & Talwalker LLC

(57) ABSTRACT

An apparatus includes a plurality of output filters. Each output filter is to provide a respective output power signal at a respective voltage level. The apparatus also includes a plurality of power multiplexers. Each power multiplexer corresponds to a respective one of the output filters and each has a respective output coupled to an input of the respective one of the output filters. Each of the power multiplexers has a plurality of inputs. The apparatus further includes a plurality of power cells. Each power cell is coupled to a respective input of at least some of the power multiplexers. In addition, the apparatus includes a control unit to control the power multiplexers to selectively establish a connection between the output of each power multiplexer and at least one of the inputs of the power multiplexer.

10 Claims, 6 Drawing Sheets

US 7,541,693 B2

POWER DISTRIBUTION NETWORK FOR COMPUTER SYSTEMS AND OTHER LOW-POWER APPLICATIONS

BACKGROUND

In a typical power distribution arrangement for a small computer such as a personal computer or a laptop computer, an unregulated power signal is supplied in parallel to a number of different voltage converters and/or regulators. Each converter/regulator provides a respective regulated voltage level to one or more loads via a respective power supply rail. For example, three linear dc-dc regulators may respectively provide a 2.5 V, 1.25 V and 1.05 V power supply signal, and five switching dc-dc converters may respectively provide a 5 V, 3.3 V, 1.5 V, 1.2 V and 1 V power supply signal.

When a small computer is redesigned, it is often the case that a substantial redesign of the power distribution system for the computer is also needed to reflect changes in voltage and/or current requirements. Moreover, each converter/regulator is typically designed for worst case demands, so that a considerable amount of inefficiency may be designed into the power distribution system due to duplication of hardware.

DETAILED DESCRIPTION

Figure 1:
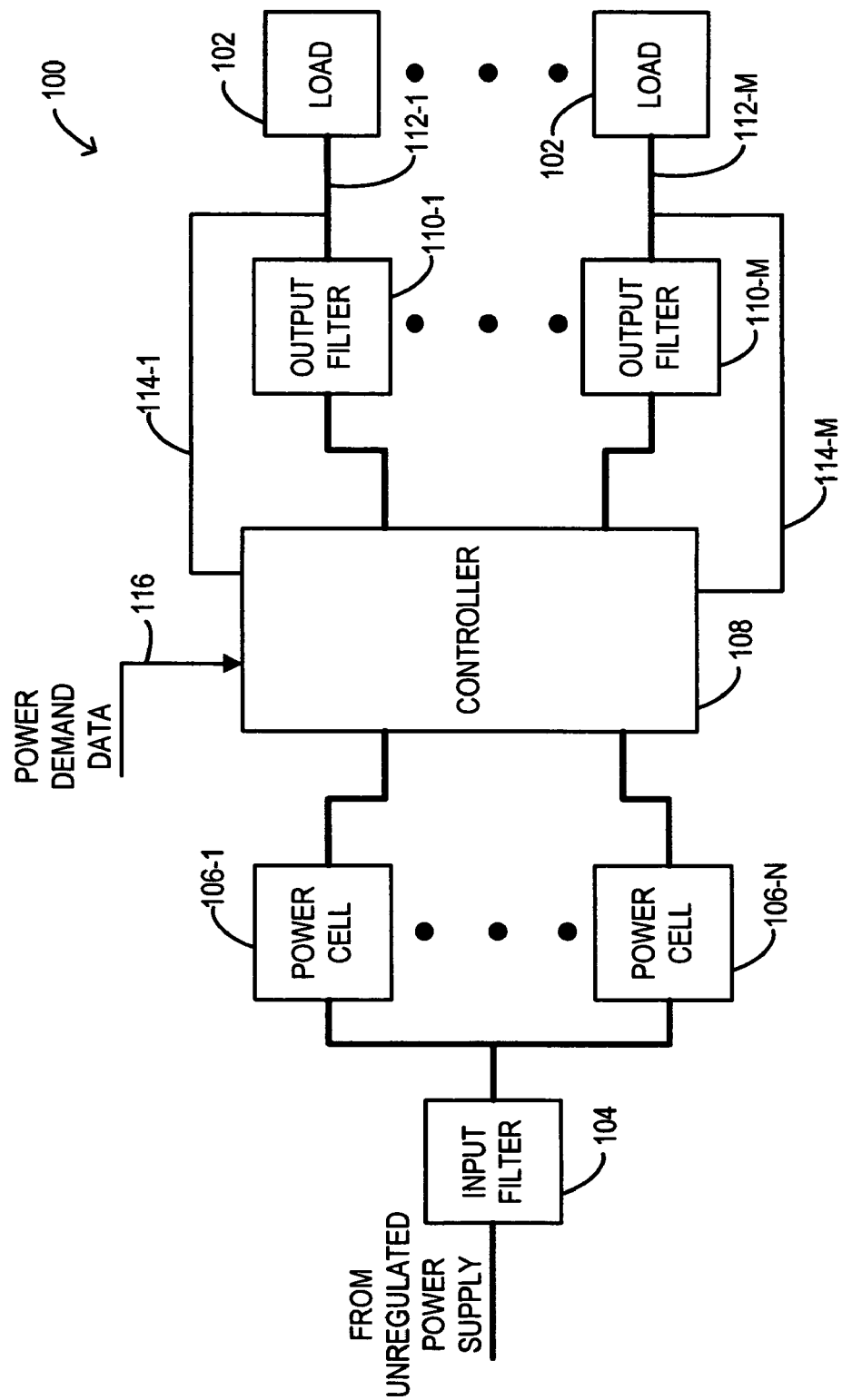
FIG. 1 is a block diagram of a power distribution network and associated loads provided in accordance with some embodiments.

FIG. 1 is a block diagram of a power distribution network 100 and associated loads 102 provided in accordance with some embodiments.

The power distribution network 100 includes an input filter 104 and a number of power cells 106. The input filter 104 receives and filters an unregulated power supply signal and supplies a filtered unregulated power supply signal to the power cells 106.

In some embodiments, the number of power cells 106 may be rather large. For example, the number of power cells 106 may be 20 or more or may even be in the hundreds. Some of the power cells 106 may be constituted by one or more switches composed of power MOSFETs (metal oxide semiconductor field effect transistors), that may operate as linear dc-dc regulators. Some of the power cells 106 may be elements or building blocks of switching dc-dc converters or may be switching dc-dc converters themselves. The power cells 106 may all be of one type or may be of various types. In some embodiments, one or more of the power cells 106 may be formed as integrated circuits. Two or more of the power cells 106 may be formed as respective circuit blocks on a single integrated circuit die.

The power distribution network 100 also includes a controller 108. The controller 108 is coupled to receive switched or pulsed power signals output from the power cells 106. Further details of the controller 108 will be provided below.

In addition, the power distribution network 100 includes a number of output filters 110. The number of output filters 110 may be equal to the number of power supply rails and/or loads that the power distribution network 100 is intended to serve. In some embodiments, the number of output filters 110 may be from three to eight or greater. The output filters 110 are coupled to the controller 108 to receive regulated power supply voltages distributed by the controller 108. Each output filter 110 provides a respective regulated or unregulated output power signal at a respective voltage level. In some embodiments, the levels may be, among others, 5 V, 3.3 V, 2.5 V, 1.5 V, 1.25 V, 1.2 V, 1.05 V and 1 V, or a subset of these voltages.

The outputs of the output filters 110 are each coupled to a respective power supply rail 112, and via the rails 112 to the loads 102. (Although not indicated in the drawing, more than one load 102 may be coupled to a given power supply rail 112.) In addition, voltage and/or current sensing circuitry (not separately shown) is coupled to the outputs of the output filters 110 to sense the voltage and/or current levels at the outputs and to provide voltage- and/or current-sense signals to the controller 108 via feedback paths 114. The controller 108 may also receive input data (indicated at 116) to indicate conditions in one or more of the loads that may call for changes in the current drawn by the loads. This data may, for example, include status signals from one or more of the loads or an external system controller (not shown) to indicate the current mode/status of the loads. The controller 108 may be operative to respond to one or more of the data 116 and/or the feedback signals, to select and allocate the power cells 106 to be coupled to each of the power supply rails 112.

Figure 1A:
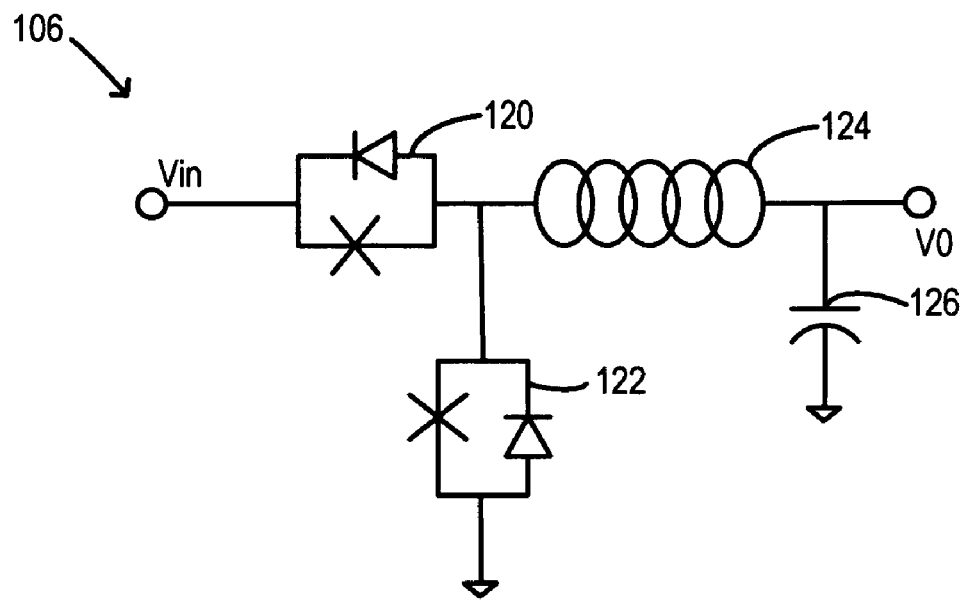
FIGS. 1A and 1B show details of examples of power cells that are part of the power distribution network of FIG. 1.

FIG. 1A is a schematic circuit diagram that shows details of one possible configuration of one or more of the power cells 106. As seen from FIG. 1A, the example power cell 106 may include switches 120, 122, a coil 124 and a capacitor 126 interconnected as a conventional switching dc-dc converter.

Figure 1B:
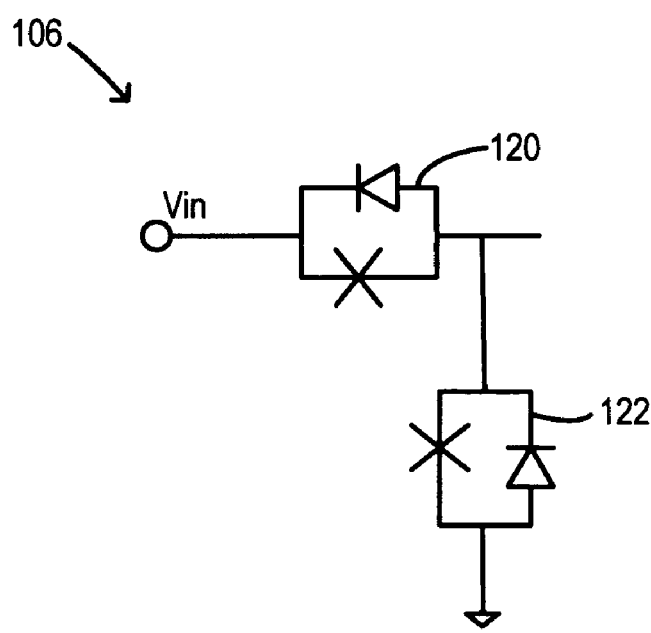

Another example configuration of a power cell 106, shown in FIG. 1B, may include the switching components of the dc-dc switching converter shown in FIG. 1A.

Figure 2:
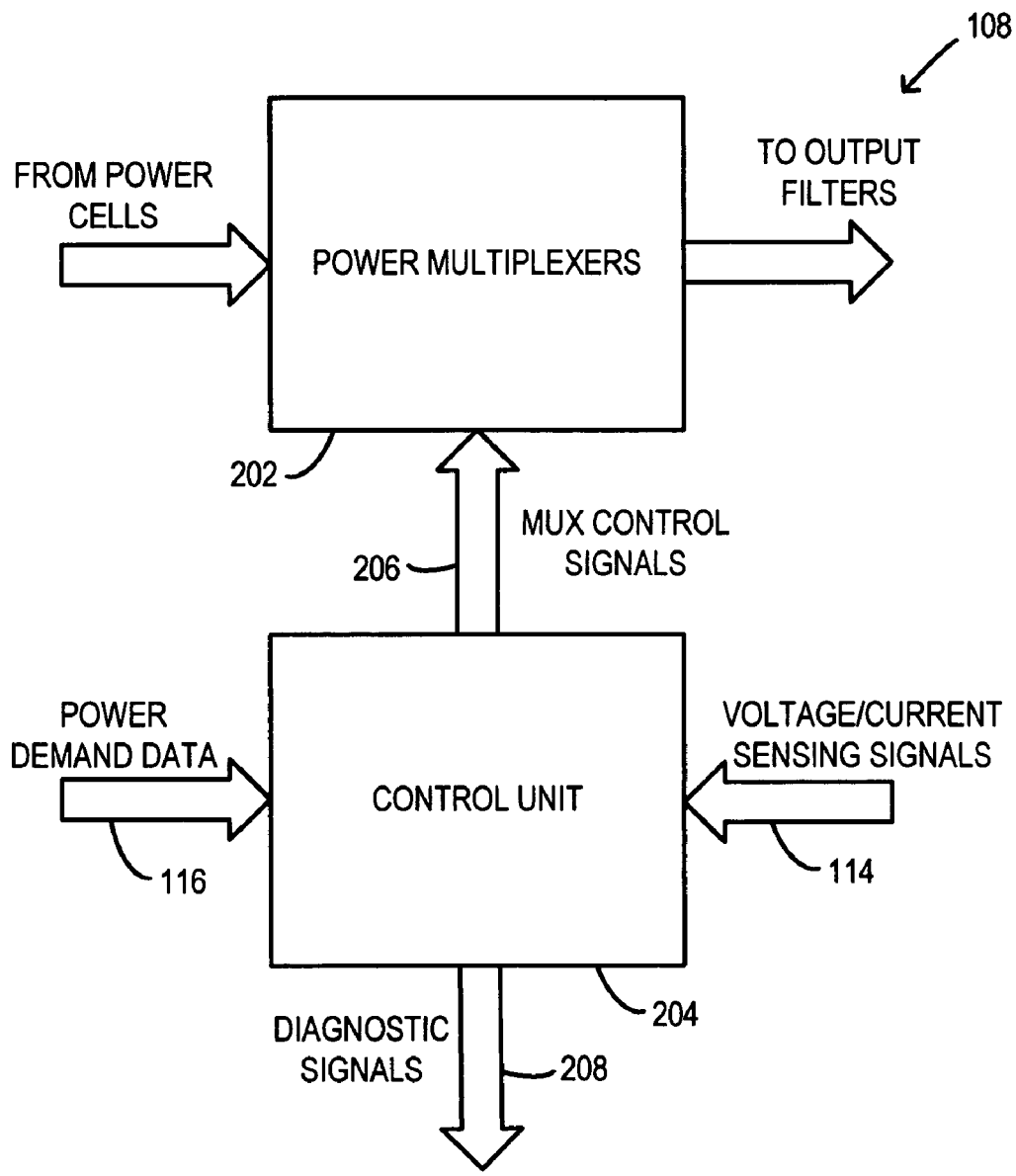
FIG. 2 is a block diagram of a controller component that is part of the power distribution network of FIG. 1.

FIG. 2 is a block diagram of the controller 108. The controller 108 may perform voltage regulation functions, in addition to selection and/or allocation of power cells 106 for coupling to the power supply rails 112.

The controller 108 includes a number of power multiplexers, which are collectively represented by block 202. The number of power multiplexers may be equal to the number of output filters 110 (FIG. 1) and thus may be equal to the number of power supply rails served by the power distribution network 100. Thus, each multiplexer may correspond to a respective one of the output filters 110. The power multiplexers 202 collectively receive the regulated or switched power signals output from the power cells 106 (FIG. 1) and distribute the regulated or switched power signals among the output filters 110. Each power multiplexer may be operable to selectively establish a connection between its output and one or more or its inputs.

The controller 108 also includes a control unit 204 which is coupled to the power multiplexers 202. The control unit 204 may be operative to control the states of the power multiplexers via control signals applied by the control unit 204 to the power multiplexers 202 as indicated at 206. In some embodiments, the control unit 204 may be implemented as a suitable programmed microcontroller. The control unit 204 may determine the multiplexer control signals which it is to generate based on one or both of the power demand data 116 and the voltage- and/or current-sense signals 114. The control unit 204 may, in some embodiments, determine the multiplexer control signals which it is to generate by accessing a look-up table (not separately shown) based on one or both of the power demand data 116 and the voltage-and/or current-sense signals 114. In addition or alternatively, the control unit 204 may determine the multiplexer control signals which it is to generate based on one or more algorithms programmed to control the control unit 204. In some embodiments, the control unit 204 may be integrated with the system CPU (i.e., a microprocessor, which is not separately shown in FIG. 2) or another intelligent computing device.

The control unit 204 may also generate signals (indicated at 208) to represent diagnostic conditions that may be detected by the control unit 204 based on one or more of the power demand data 116 and the voltage- and/or current-sense signals 114. The diagnostic signals 208 may, for example, be provided to the system CPU (not shown in FIG. 2), if separate from the control unit 204.

Figure 3:
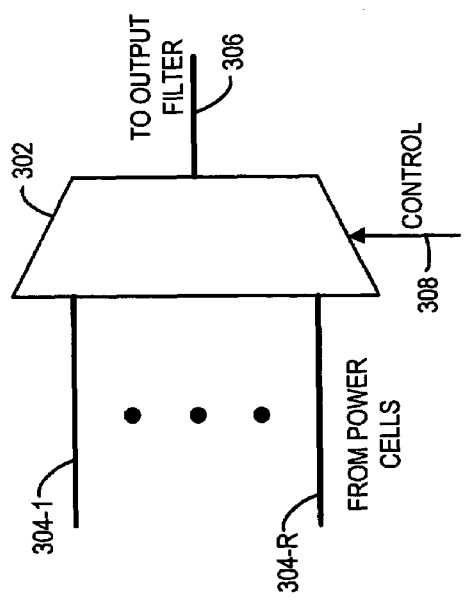
FIG. 3 is a schematic representation of a typical multiplexer that is included in the controller component of FIG. 2.

FIG. 3 is a schematic representation of a typical multiplexer 302 that is included in the block of power multiplexers 202 shown in FIG. 2. Continuing to refer to FIG. 3, the multiplexer 302 has a plurality of inputs 304. Each input 304 may be coupled to a respective one of the power cells 106 (FIG. 1). The number of inputs 304 may vary from multiplexer to multiplexer and need not equal the number of power cells 106. The multiplexer 302 also includes an output 306 which is coupled to the input of one of the output filters 110.

The multiplexer 302 also receives a control signal (indicated at 308) from the control unit 204 (FIG. 2) to control which one or more (if any) of the inputs 304 is coupled to the output 306 of the multiplexer 302.

Although not so indicated in the drawings, at least some of the multiplexers may be cascaded to allow for complex patterns of selection, assignment and allocation of power cells 106 among the power supply rails 112. Thus, in some cases, one or more inputs of a multiplexer may be coupled to the output of one or more other multiplexers. Consequently, the output of a multiplexer may be coupled to an input of another multiplexer. Further, an output of a multiplexer that is coupled to an input of another multiplexer may also be considered to be coupled to an output filter to which the output of the other multiplexer is coupled.

Figure 4:
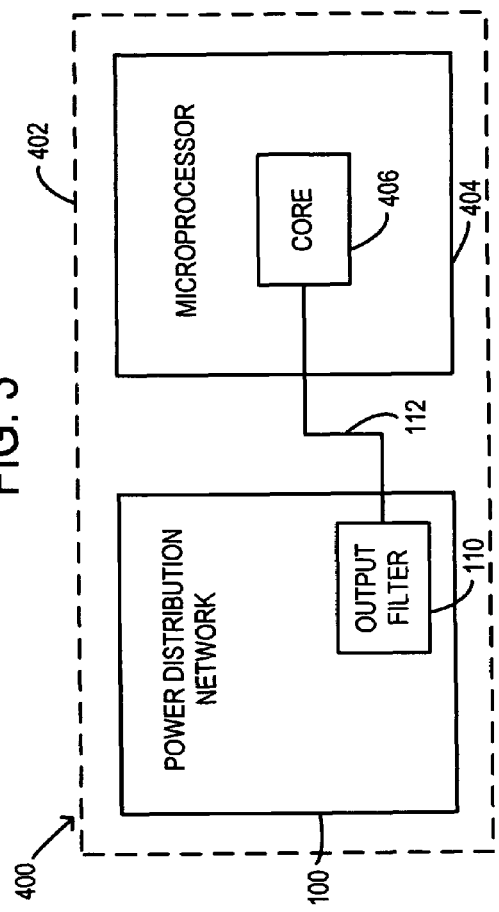
FIG. 4 is a board-level block diagram of a computer system that includes the power distribution network of FIG. 1.

FIG. 4 is a board-level block diagram of a computer system 400 that includes the power distribution network 100. The computer system 400 may, for example, be a personal computer, a laptop computer, a server computer or another type of computing system. The computer system 400 includes a circuit board 402, which is shown in phantom. The circuit board 402 may be a printed circuit board. The power distribution network 100 is supported on the circuit board 402. For example, the power distribution network 100 and/or some or all of its constituent elements may be constituted by one or more integrated circuits (not separately shown) that are mounted on the circuit board 402.

The computer system 400 also includes a microprocessor 404. The microprocessor 404 includes, in turn, a processing core 406. The microprocessor 404 may be constituted by a suitably packaged integrated circuit die (not separately shown) which is mounted on the circuit board 402.

As indicated above, the power distribution network 100 includes an output filter 110 in addition to other constituent elements. The filtered power supply signal output from the output filter 110 is coupled to the processing core 406 of the microprocessor 404 via a power supply rail 112. Thus power for the processing core 406 is provided by the power distribution network 100. In some embodiments, the power supply signal provided to the processing core 406 may be at a different voltage level from power supply signals provided to other blocks (not separately shown) of the microprocessor 404.

Other output filters 110, and other loads for the power distribution network 100, may be present but are not shown in the drawing. The circuit board 402 shown in FIG. 4 may have other components mounted thereon besides those indicated in FIG. 4. For example, such other components may include random access memory (RAM), read only memory (ROM), a memory controller, a graphics controller, a chipset, etc.

From foregoing discussion, it will be appreciated that there may be coupling connections between the microprocessor 404 and the power distribution network 100 in addition to the power supply rail 112 shown in FIG. 4. For example, the microprocessor 404 may provide, to the control unit 204 (FIG. 2) of the controller 108 of the power distribution network, status and/or other information concerning the core 406 to indicate the current or future power demands of the core 406. In addition, the control unit 204 may supply to the microprocessor 404 information concerning diagnostic conditions detected by the control unit 204.

Figure 5:
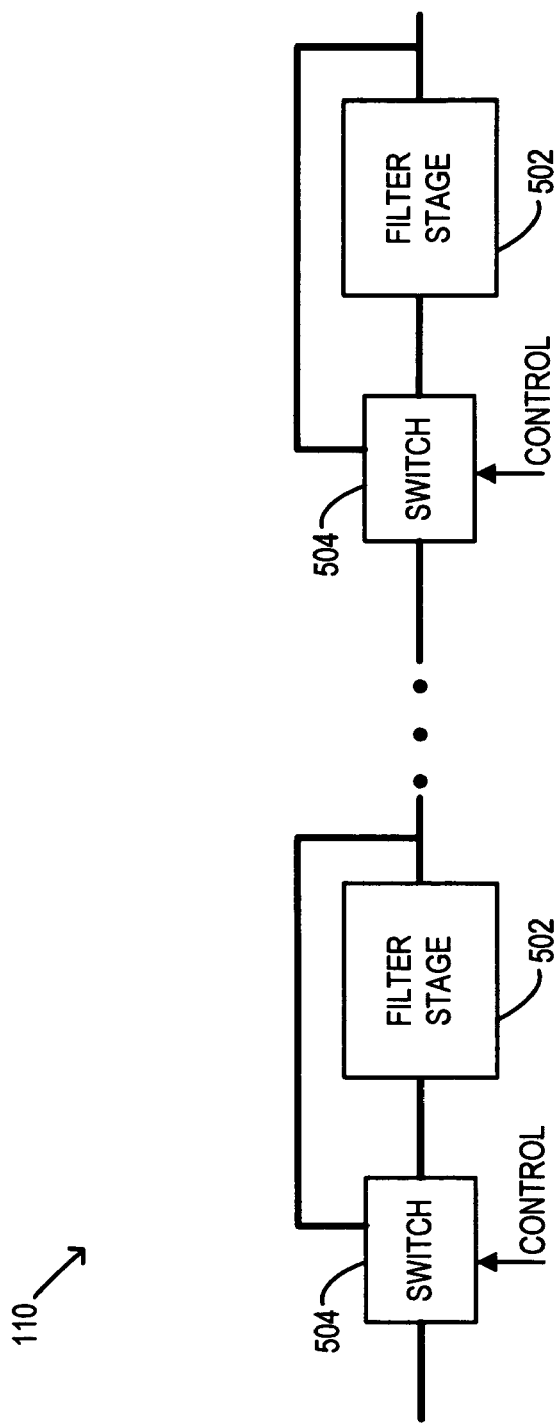
FIG. 5 is a block diagram of an example output filter that is part of the power distribution network of FIG. 1.

In some embodiments, all of the output filters 110 may be single stage filters. In other embodiments, at least some of the output filters 110 may be multi-stage filters. For example, some of the output filters 110 may be arranged as indicated in FIG. 5. The example output filter 110 shown in FIG. 5 is formed from a sequence of two or more filter stages 502 connected in series. Upstream from each of one or more of the filter stages 502 is a respective switch 504. Each switch 504 may be controlled by a control signal from the control unit 204 (FIG. 2) to selectively bypass the immediately following filter stage 502. (The control unit 204 may be coupled to the switches 504 via control signal paths which are not shown in FIGS. 1 and 2.) With the arrangement shown in FIG. 5, the control unit 204 may operate to modify the over-all characteristics of at least some of the output filters 110 as appropriate in view of changes in the power cell or cells 106 coupled to the output filters 110 by the power multiplexers 202, and/or to compensate for changes in operating characteristics of the power cell or cells 106 coupled to the output filters 110. The output filters 110 may be series filters, as shown, or alternatively may be configured in a parallel arrangement or in a series/parallel arrangement.

Figure 6:
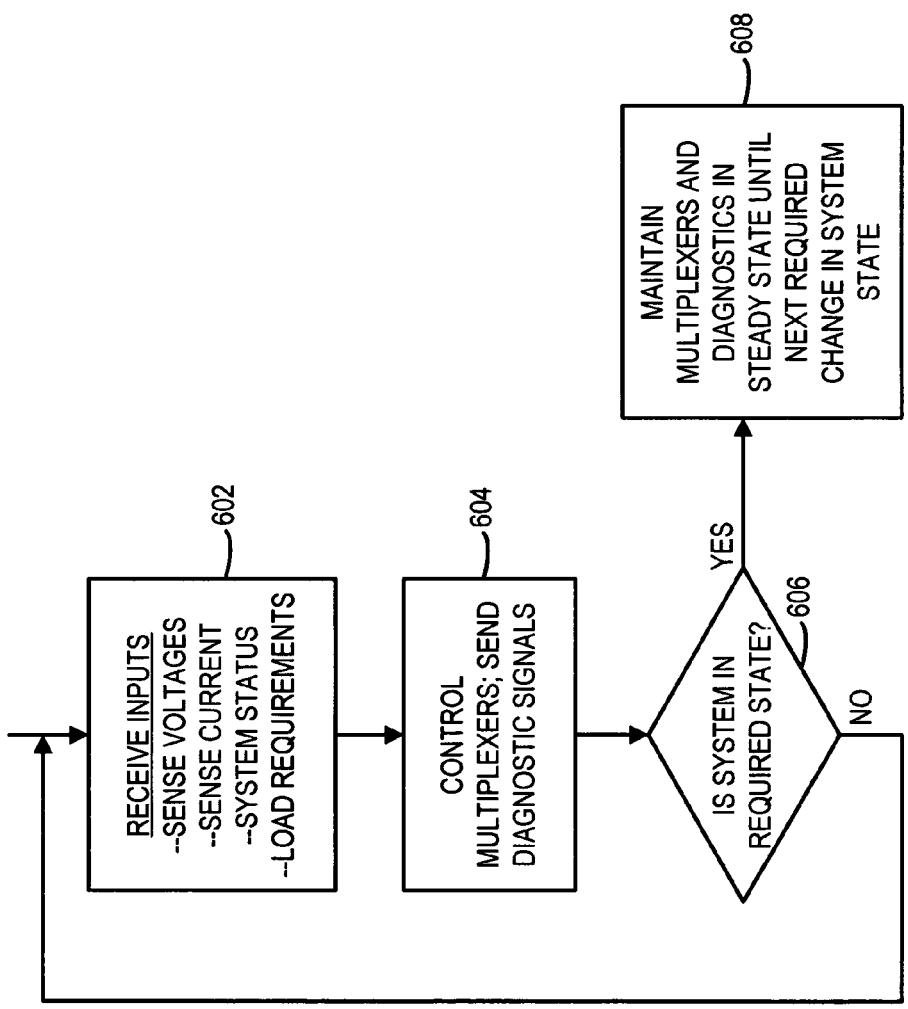
FIG. 6 is a flow chart that illustrates a process performed by a control unit of the controller of FIG. 2.

FIG. 6 is a flow chart that summarizes a process that may be performed by the control unit 204 (FIG. 2) of the controller 108 in accordance with some embodiments. At 602 in FIG. 6, the control unit 204 receives one or more input signals. These input signals may, for example, indicate the voltage level and/or the current level at the output of one or more of the output filters 110. In addition or alternatively, these input signals may be from one or more of the loads 102 and may detect and/or predict the present or future power demands for the loads 102. In addition or alternatively, the input signals may be from a system control device and may indicate information regarding the status of one or more components of the system. In addition or alternatively, other input signals may be provided to the control unit 204, including signals indicative of environmental or internal conditions such as temperature.

At 604 in FIG. 6, the control unit 204 controls one or more of the power multiplexers 202 based on (in response to) one or more of the input signals. By controlling the power multiplexers, the control unit 204 controls which one or ones of the power cells 106 are coupled to each of the output filters 110. Thus the power distribution network 100 may operate to be dynamically reconfigured in response to changing conditions in the loads 102 or elsewhere in the system 400. Moreover, the controller 108 may be arranged to detect failures among the power cells 106 and may switch in other power cells to replace failing power cells. Thus the power distribution network 100 may be designed with redundancy and fault tolerance that have not been present in conventional small computer power distribution systems. As also indicated at 604, the control unit may output one or more signals indicative of diagnostic conditions.

At decision block 606, it is determined whether the power supplied via the power distribution network 100 meets current system requirements. If not, the process loops back to 602 and 604. If the current requirements are being met, then (as indicated at 608) the control unit 204 maintains the multiplexers 202 and its diagnostic output signals in their current states.

Since power cells 106 may be selected and/or allocated in response to changing demands, it may be possible to operate each power cell at or near its optimal power level, so that the over-all efficiency of the power distribution network 100 may be greater than the efficiency of conventional power distribution systems. Furthermore, the power distribution network 100 may be inherently more flexible than conventional power distribution systems, so that there may be a reduced need for redesigning the power distribution network in response to changes in design in the computer system 400.

The power distribution network 100 disclosed herein has been described in the context of a small computer system such as a personal computer or a laptop computer. However, the power distribution network architecture disclosed herein may also be applied in other devices. These other devices may include, for example, larger computers such as server computers, as well as communication equipment such as network processors. These other devices may also include hand-held devices, such as PDAs (personal digital assistants).

In some embodiments, not all of the power distribution network need necessarily be supported on a single circuit board. Rather, various components of the power distribution network may be supported on two or more circuit boards. Moreover, the power distribution network may be on a different circuit board from some or all of the loads served by the power distribution network.

As used herein and in the appended claims, "sharing a circuit board with an integrated circuit" means being supported on the same circuit board with the integrated circuit. The term "integrated circuit" should be understood to refer either to all of the circuitry on an integrated circuit die or to one or more components, sub-components or functional blocks of such circuitry.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   sensing a voltage level and/or a current level at a respective output of each of a plurality of output filters to generate signals indicative of the voltage level and/or the current level at said respective output of each of the plurality of output filters;
   feeding back said signals to a controller;
   receiving at said controller said signals indicative of the voltage level and/or the current level at said respective output of each of the plurality of output filters; and
   controlling a plurality of power multiplexers based at least in part on the received signals, the power multiplexers to selectively couple power cells to said output filters.

2. The method of claim 1, further comprising:
   providing said voltage levels as power supply voltages to integrated circuits.

3. The method of claim 2, wherein said integrated circuits share a circuit board with at least some of said power multiplexers.

4. A system comprising:
   a plurality of output filters, each to provide a respective output power signal at a respective voltage level;
   a plurality of power multiplexers, each corresponding to a respective one of the output filters and each having a respective output coupled to an input of the respective one of the output filters, each of the power multiplexers having a plurality of inputs;
   a plurality of power cells, each coupled to a respective input of at least some of said power multiplexers;
   a control unit to control the power multiplexers to selectively establish a connection between the output of each power multiplexer and at least one of the inputs of said each power multiplexer;
   feedback paths to feed back to the control unit signals indicative of voltage and/or current levels at outputs of said output filters; and
   a microprocessor that includes a core unit, said core unit having a power supply rail coupled to one of said output filters to receive the respective output power signal provided by said one of said output filters.

5. The system of claim 4, wherein said plurality of power cells includes at least six power cells.

6. The system of claim 4, wherein said plurality of power cells includes at least 20 power cells.

7. The system of claim 4, wherein said plurality of output filters includes at least three output filters.

8. The system of claim 7, wherein the at least three respective voltage levels are all different from each other.

9. The system of claim 8, wherein the at least three voltage levels are all no more than about 5 volts.

10. The system of claim 4, further comprising a circuit board;
    all of said output filters, said power multiplexers, said power cells, said control unit and said microprocessor being supported on said circuit board.

* * * * *